Sept. 22, 1931.      O. CAMMANN, JR                1,824,328
                   DOMESTIC MIXING MACHINE
                    Filed Nov. 19, 1929        3 Sheets-Sheet 1

INVENTOR
Oswald Cammann, Jr.,
BY
J.H. McCready,
his ATTORNEY.

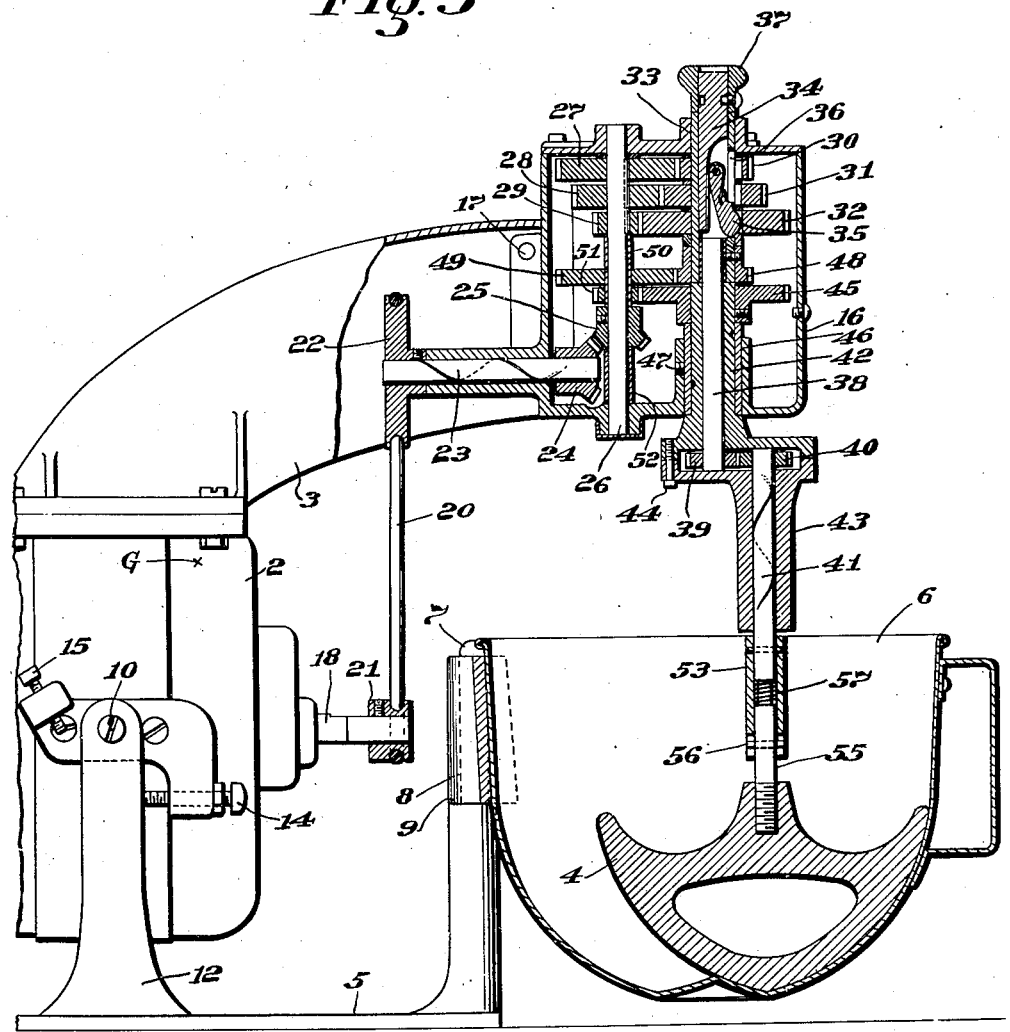

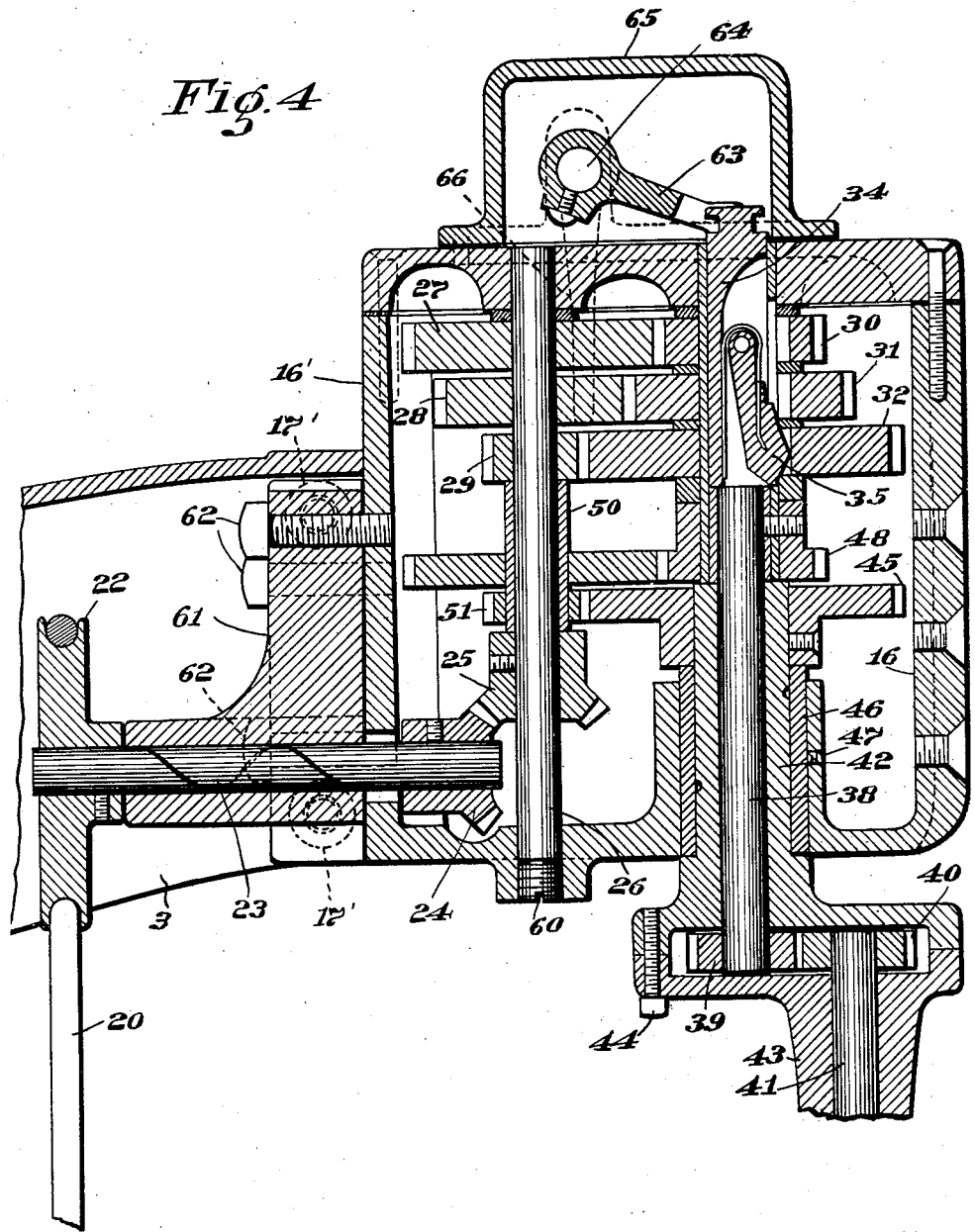

Patented Sept. 22, 1931

1,824,328

UNITED STATES PATENT OFFICE

OSWALD CAMMANN, JR., OF NEWTON, MASSACHUSETTS

DOMESTIC MIXING MACHINE

Application filed November 19, 1929. Serial No. 408,220.

This invention relates to domestic mixing apparatus of the general type used for beating frostings, whipping cream, mixing doughs, batters, or the like, and performing various other mixing or beating operations.

It is the chief object of the invention to improve machines of this type with a view to simplifying their organization, reducing the expense of manufacture, and making them more convenient to use.

The nature of the invention will be readily understood from the following description when read in connection with the accompanying drawings, and the novel features will be particularly pointed out in the appended claims.

In the drawings,

Fig. 3 is a side elevation, partly in section; and

Fig. 4 is a vertical sectional view on a larger scale showing a slightly different arrangement of the transmission mechanism.

Preliminary to a detailed description of the machine shown it may be pointed out that in prior machines of this general type the ingredients to be mixed or beaten are usually held in a pan, bowl, or container of some kind (hereinafter for convenience referred to as a "bowl") and the placing of the bowl in the machine or its removal therefrom, particularly when substantially full, is an awkward operation. In some machines it is necessary to remove the dash or beater from the machine in order to remove the bowl when the mixing operation has been completed. It is one of the objects of this invention therefore, so to organize the machine that the placing of the bowl in the machine, or its removal therefrom, will be facilitated.

Figure 1:
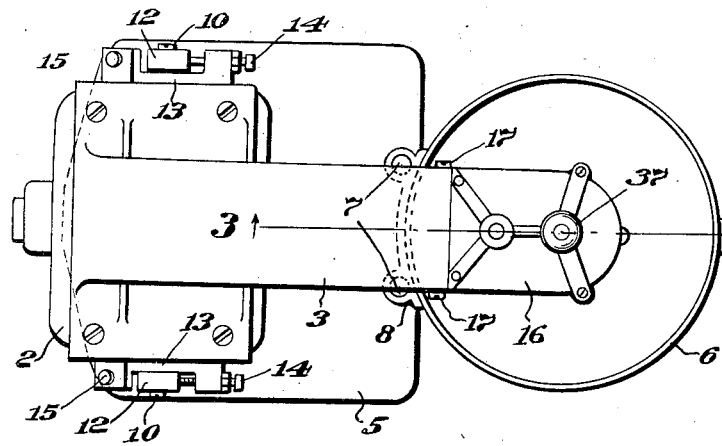
Figure 1 is a plan view of a machine embodying the present invention.
Figure 2:
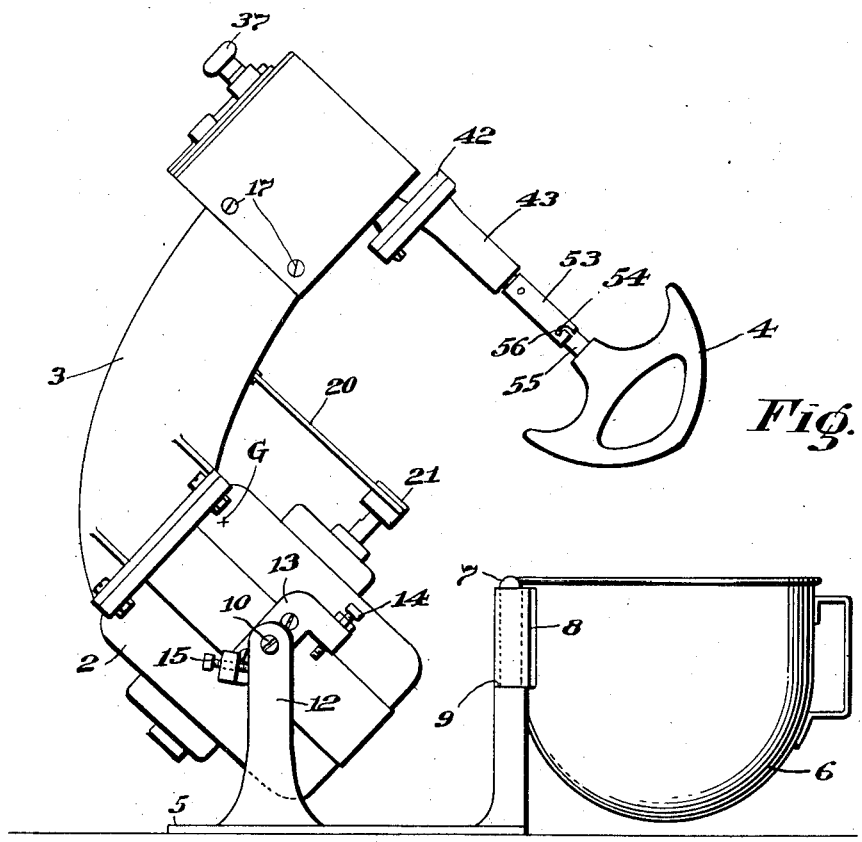
Fig. 2 is a side view of the machine shown in Fig. 1 but illustrating the machine in a tipped position.

Referring first to Figs. 1, 2 and 3, the machine there shown comprises a motor 2, a frame 3 rigidly mounted on said motor, a dash or beater 4, and connections between said dash and the motor for driving the dash. The motor is supported on a base 5 and this base also preferably is utilized to support the bowl 6. For this purpose the base is provided at its forward edge with two upright posts 7—7 and the bowl 6 has a piece 8 secured to one side thereof and provided with two holes to receive the upper ends of these posts, the posts being shouldered at an intermediate point, as shown at 9, to support the member 8. Normally the parts are in substantially the relationship shown in Fig. 3 with the dash 4 vertically disposed and working in the bowl 6. The motor and the parts carried thereby, however, are so supported that they can be swung into the position shown in Fig. 2 where the dash is removed from the bowl sufficiently to permit the lifting of the bowl off the posts 7—7. For this purpose the motor 2 is pivoted at 10—10 on supports or trunnions 12—12 integral with or carried by the base 5. Small brackets 13—13 secured to opposite sides of the motor 2 are each equipped with adjustable stop screws or bolts indicated at 14 and 15, respectively, which are adapted to engage opposite sides of their respective trunnions 12 and limit the range of tipping movement of the motor. These brackets may conveniently be utilized to receive the trunnion screws 10 as shown in Fig. 2. The screws 14—14 determine the operative position of the dash 4, and they are usually so set that the dash just clears the bottom of the bowl. The other screws 15—15 determine the inoperative or raised position of the dash. Since the frame 3 extends upwardly and forwardly from the motor 2 and carries the transmission mechanism through which the dash is driven, the center of gravity or center of mass of the entire assembly supported on the pivots 10—10 lies above and at the right of the supports 12 in some such location as that indicated by the cross G, Fig. 3, adjacent said pivots. Advantage is taken of this fact in holding the dash in its raised or inoperative position, the stop screws 15—15 being so adjusted that the center of gravity will be swung to the left-hand side of the pivotal axis 10—10, as indicated in Fig. 2. The machine, therefore, will be held by gravity at each of its two limits of movement.

The mixing of materials having different consistencies makes it desirable to adjust or vary the speed of revolution of the dash. It is also desirable to give the dash both a rotary motion about its own axis and also to revolve said axis, or, in other words, to give the dash a planetary movement. The transmission mechanism carried by the frame 3 is designed to accomplish these objects. Preferably this mechanism is mounted in a casing 16 which, with the mechanism, constitutes a unit that may be manufactured independently and mounted in or removed from the arm 3. It is held in the arm by four screws 17—17, Figs. 1 and 2. Power is transmitted from the shaft 18 of the motor 2 to the transmission mechanism through a belt 20 running on grooved pulleys 21 and 22, the former being secured to the motor shaft and the latter to a horizontal shaft 23 which forms part of the transmission mechanism and projects backward horizontally from the transmission casing into the arm 3, its outer end being directly over the end of the motor shaft. This shaft 23 is connected through bevel gears 24 and 25, Fig. 3, to a vertical driving shaft 26. Three gears 27, 28 and 29 of different sizes are keyed to the shaft 26 and mesh, respectively, with gears 30, 31 and 32, mounted to rotate freely on a hollow driven shaft 33. A plunger 34 slides in the shaft 33 and carries a spring pressed key 35 riding in a slot 36 formed in one side of the shaft where it can enter the keyway or slot in the inner wall of each of the gears 30, 31 and 32. At its upper end the plunger 34 is provided with a knob 37 by means of which it may be moved to slide the key 35 into engagement with any one of the gears 30, 31 or 32. These gears are spaced from each other by collars or washers.

A vertical shaft 38 is secured in the lower end of the hollow shaft 33, and forms, in effect, a continuation of the latter. At its lower end it carries a gear 39 meshing with a gear 40 on the upper end of the dash shaft 41.

The shaft 38 revolves in a sleeve-like member 42, while the shaft 41 revolves in a similar member 43, and these two members are secured together by bolts, one of which is shown at 44, and form what may be termed the "support" for the dash 4. This support is held in its operative relationship to the elements of the transmission mechanism by a gear 45 which is secured to the sleeve 42, this gear resting on the upper end of a bushing 46 held in the casing by one or more screws 47.

Between the sleeve 42 and the hollow shaft 33 is a back gearing that serves to revolve the dash support. This gearing comprises a pinion 48 fast on the hollow shaft 33 and driving a gear 49 secured on a bushing 50 that revolves freely on the driving shaft 26. Another pinion 51 fast on the bushing 50 meshes with the gear 45 previously mentioned. A thrust bushing 52 interposed between the lower wall of the transmission casing 16 and the bevel gear 25 supports the driving shaft 26.

At its lower end the shaft 41 carries a sleeve-like holder 53 pinned to the shaft and provided with a bayonet slot 54, Fig. 2. The shaft 55 of the dash carries a pin 56 to enter this slot. A spring 57, Fig. 3, may be interposed between the ends of the shafts 55 and 41 to prevent accidental displacement of the pin 56 in the bayonet slot. This arrangement provides for the convenient removal of the dash 4 when desired for washing, or for replacement with a dash or beater of a different construction.

As shown in Fig. 3 the key 35 positively connects the driven shaft 33 with the gear 32. This gear is in mesh with the gear 29 on the driving shaft 26, and the ratio of these two gears 29 and 32 is such that the dash at this time will be revolved at a relatively low speed. When the plunger 34 is raised to make the gears 31 and 28 operative to drive the dash it will then be revolved at a higher speed. And if the plunger is raised to the upper limit of its movement so that the gears 27 and 30 are made operative to drive the shaft 33, the dash then will be revolved at a still higher speed. It should be noted that this adjustment of the speed can be made while the machine continues to operate uninterruptedly.

The speed ratio between the driven shaft 33 and the dash support 43 remains constant so that the rotary motion of the dash around the axis of the shaft 28 varies with the speed of revolution of the dash about its own axis. The transmission casing 16 may be filled to any desired degree with grease or other lubricating material.

It will be clear from the foregoing that the invention provides a mixer particularly adapted for domestic purposes which is of relatively simple construction, will handle a wide variety of work, and which is very convenient to use. The fact that the dash can quickly be swung out of the bowl or returned to its operative position again, and will remain in either its operative or inoperative position, saves time in using the machine and adds materially to its convenience. An ample range of speeds is obtainable by adjusting the transmission mechanism, and the fact that it is merely necessary to slide the key 35 from one position to another to shift to a different speed without stopping the machine contributes further to convenience. The nature of the design is such that it is relatively economical to manufacture, and both the manufacturing and assembling operations are facilitated by making the transmission mechanism and its casing in a separate unit which, when completed, is secured to the arm 3. When in this position the transmission casing forms, in effect, a part of the machine frame.

Fig. 4 shows a slightly different organization of transmission mechanism, the drive shaft 26 of this mechanism being mounted on the upper rounded end of a thrust plug 60 instead of being supported in the manner above described. In this arrangement also the boss 61 which carries the bearing for the horizontal shaft 23 is made separate from the casing 16' but is secured to it by bolts 62, this boss also being arranged to take the screws or bolts 17' which secure the transmission casing to the outer end of the arm 3.

The chief difference, however, between the construction shown in Fig. 3 and that illustrated in Fig. 4 is in the mechanism for raising the plunger 34. The upper end of this plunger is grooved to receive pins projecting from the forked end of a yoke 63 which is secured on a horizontal shaft 64 supported in a cap piece 65. The shaft extends through the cap and at a point outside the cap a handle 66 is secured to it. By swinging this handle the plunger 34 is raised or lowered to shift the key 35 up or down, as above described.

It will be understood that the term "dash" is intended to include beaters, dough hooks, pastry knives, whisks, and the like.

While I have herein shown and described preferred embodiments of my invention, it will be understood that some departures may be made from the details of the construction shown without departing from the spirit or scope of the invention.

Having thus described my invention, what I desire to claim as new is:

1. A domestic mixer comprising an electric motor, a base adapted to support a bowl, a frame secured to and movable with said motor, said frame including an arm extending upwardly therefrom and a transmission casing carried by said arm and overhanging said bowl, a dash carried by said frame and arranged to work in said bowl, mechanism for transmitting motion from said motor to said dash including a transmission mechanism in said frame adjustable to vary the speed ratio between said motor and dash, and parts on said base summiting said motor and frame for tipping movement to swing said dash into its operative position in said bowl and into an inoperative position out of the bowl, the weight of said motor, casing and frame and the parts carried thereby being so disposed as to hold said dash in either of said positions into which it is moved, said motor and casing being so disposed relative to said frame as to balance said frame during its tipping movement.

2. A domestic mixer comprising an electric motor a supporting base therefor, a frame secured rigidly to said motor and including an arm extending upwardly and forwardly from the motor in a plane approximately parallel to the motor shaft, a vertically disposed dash carried by said frame, a transmission mechanism supported by said frame and operatively connected with said dash to give said dash a planetary movement, said transmission mechanism including a shaft extending horizontally into said frame to a position above the shaft of said motor, and driving connections between said transmission shaft and said motor shaft, said motor and transmission mechanism being so disposed relative to said frame as to locate the center of mass of the unit formed thereby adjacent said motor supporting base.

3. A domestic mixer comprising an electric motor, a frame secured rigidly to said motor and including an arm and a transmission casing carried by said arm, said arm extending upwardly and forwardly from said motor, a base adapted to support a bowl, a vertically disposed dash carried by said frame and arranged to work in said bowl, a transmission mechanism in said casing connected with said dash to give it a planetary movement, said mechanism including a shaft extending backward horizontally into said arm, belt connections between said shaft and the shaft of said motor, and parts on said base supporting said motor and frame for tipping movement to swing said dash into and out of its operative position in said bowl.

4. A domestic mixer comprising an electric motor, a frame secured rigidly to said motor and including an arm and a transmission casing carried by said arm, said arm extending upwardly and forwardly from said motor, a vertically disposed dash carried by said frame, a transmission mechanism in said casing connected with said dash to drive it, said casing and mechanism being removable as a unit from said arm, and driving connections between said motor and said mechanism.

5. A domestic mixer comprising an electric motor, a frame secured adjacent one of its ends to said motor and movable therewith, said frame extending upwardly from said motor, a dash carried by said frame adjacent its other end, a variable speed mechanism carried by said frame adjacent said dash, for transmitting motion from said motor to said dash, and means for supporting the unit formed by the frame, motor, transmission mechanism and dash for tipping movement, whereby said dash may be swung into and out of its operative position, the weight of said unit being so disposed as to hold said dash in either of said positions into which it is moved.

6. A domestic mixer comprising an electric motor, a frame secured adjacent one of its ends to said motor and movable therewith, said frame extending upwardly from said motor, an upright dash carried by said frame adjacent its other end, a variable speed mechanism carried by said frame adjacent said dash, for transmitting motion from said motor to said dash, and means for supporting the unit formed by the frame, motor, transmission mechanism and dash for tipping movement, whereby said dash may be swung into and out of its operative position, the weight of said unit being so disposed with reference to the axis on which it tips as to hold said motor and the parts carried thereby in position to maintain said dash either in its operative or inoperative position as desired.

7. A domestic mixer comprising an electric motor, a frame secured adjacent one of its ends to said motor and movable therewith, said frame extending upwardly from said motor, an upright dash carried by said frame adjacent its other end, a variable speed mechanism carried by said frame adjacent said dash, for transmitting motion from said motor to said dash, means for supporting the unit formed by the frame, motor, transmission mechanism and dash for tipping movement about an axis, whereby said dash may be swung into and out of its operative position, the weight of the motor and transmission mechanism being so distributed over the frame as to balance the unit and locate the center of mass adjacent said supporting means, and means for limiting the range of tipping movement of said motor and cooperating with the motor to hold it in each of two positions to hold the dash either in its operative or inoperative position as desired.

8. A domestic mixer comprising a mixing bowl, an electric motor, a frame secured adjacent one of its ends to said motor and movable therewith, said frame extending upwardly from said motor, an upright dash carried by said frame at its other end, a variable speed mechanism carried by said frame adjacent said dash, for transmitting motion from said motor to said dash, means for supporting the bowl in position for the dash to work in it and trunnions supporting said unit formed by the frame, and elements secured thereto for tipping movement, whereby said dash may be swung into and out of the bowl, as desired, the weight of the elements secured to said frame being so distributed over the frame as to balance the frame and locate the center of mass adjacent said trunnions.

9. A domestic mixer comprising an electric motor, a frame secured adjacent one of its ends to said motor and movable therewith, an upright dash carried by said frame adjacent its other end, a variable speed mechanism carried by said frame above said dash for operating the dash, means for transmitting motion from said motor to said mechanism, trunnions supporting the unit formed by said frame and the elements movable therewith for tipping movement whereby said dash may be swung into its operative or inoperative position as desired, the weight of said unit being so disposed with reference to the axis on which it tips as to cause its center of mass to swing over said axis from one side thereof to the other in tipping said unit to move said dash from its operative to its inoperative position, or vice versa.

OSWALD CAMMANN, Jr.

CERTIFICATE OF CORRECTION.

Patent No. 1,824,328.  Granted September 22, 1931, to

OSWALD CAMMANN, JR.

It is hereby certified that error appears in the printed specification of the above numbered patent requiring correction as follows: Page 2, line 103, for the numeral "28" read 38, page 3, line 51, claim 1, for "summiting" read supporting; same page and claim, lines 58 to 61, strike out ", said motor and casing being so disposed relative to said frame as to balance said frame during its tipping movement"; and that the said Letters Patent should be read with these corrections therein that the same may conform to the record of the case in the Patent Office.

Signed and sealed this 15th day of December, A. D. 1931.

(Seal)

M. J. Moore,
Acting Commissioner of Patents.